(12) United States Patent
Welin

(10) Patent No.: US 10,746,237 B2
(45) Date of Patent: Aug. 18, 2020

(54) DISC BRAKE

(71) Applicant: Haldex Brake Products AB, Landskrona (SE)

(72) Inventor: Hans Welin, Sankt Ibb (SE)

(73) Assignee: Haldex Brake Products AB, Landskrona (SE)

( * ) Notice: Subject to any disclaimer, the term of this patent is extended or adjusted under 35 U.S.C. 154(b) by 40 days.

(21) Appl. No.: 16/065,449

(22) PCT Filed: Dec. 22, 2016

(86) PCT No.: PCT/EP2016/082502
§ 371 (c)(1),
(2) Date: Jun. 22, 2018

(87) PCT Pub. No.: WO2017/109145
PCT Pub. Date: Jun. 29, 2017

(65) Prior Publication Data
US 2019/0011000 A1   Jan. 10, 2019

(30) Foreign Application Priority Data
Dec. 22, 2015 (EP) .................... 15202224

(51) Int. Cl.
| | | |
|---|---|---|
| *F16D 55/2255* | (2006.01) | |
| *F16D 55/226* | (2006.01) | |
| *F16D 65/18* | (2006.01) | |
| *F16D 121/14* | (2012.01) | |
| *F16D 125/64* | (2012.01) | |
| *F16D 125/36* | (2012.01) | |
| *F16D 125/58* | (2012.01) | |
| *F16D 121/08* | (2012.01) | |
| *F16D 125/28* | (2012.01) | |

(52) U.S. Cl.
CPC ....... *F16D 55/2255* (2013.01); *F16D 55/226* (2013.01); *F16D 65/18* (2013.01); *F16D 65/183* (2013.01); *F16D 2121/08* (2013.01); *F16D 2121/14* (2013.01); *F16D 2125/28* (2013.01); *F16D 2125/36* (2013.01); *F16D 2125/58* (2013.01); *F16D 2125/587* (2013.01); *F16D 2125/64* (2013.01)

(58) Field of Classification Search
CPC .. F16D 55/2255; F16D 65/18; F16D 2125/28; F16D 2125/64; F16D 2125/645
USPC ........................................... 188/72.9
See application file for complete search history.

(56) References Cited

U.S. PATENT DOCUMENTS 3,727,727 A * 4/1973 Hauth ................. F16D 55/226
188/72.9
3,900,083 A * 8/1975 Hauth ................. F16D 55/226
188/72.2

(Continued)

FOREIGN PATENT DOCUMENTS

EP    0523439 A1 * 1/1993 ............. B60T 1/065
EP    1384913 A2      1/2004

(Continued)

*Primary Examiner* — Thomas J Williams
(74) *Attorney, Agent, or Firm* — St. Onge Steward Johnston & Reens LLC

(57) ABSTRACT

A disc brake, in which a force-redirecting device is arranged between an actuator and the brake caliper for transmitting an input force from the actuator to a brake caliper of the brake actuation mechanism.

20 Claims, 5 Drawing Sheets

(56) References Cited

U.S. PATENT DOCUMENTS

| | | | | |
|---|---|---|---|---|
| 3,952,844 | A * | 4/1976 | Newstead | F16D 55/224 |
| | | | | 188/72.8 |
| 4,036,329 | A * | 7/1977 | Anderson | F16D 55/224 |
| | | | | 188/72.7 |
| 5,249,648 | A * | 10/1993 | Bejot | F16D 55/226 |
| | | | | 188/72.7 |
| 6,698,553 | B2 * | 3/2004 | Varela | F16D 65/18 |
| | | | | 188/72.6 |
| 6,962,244 | B2 * | 11/2005 | Ortegren | F16D 65/183 |
| | | | | 188/106 F |
| 9,903,431 | B2 * | 2/2018 | Drewes | F16D 65/28 |
| 2007/0227837 | A1 * | 10/2007 | Barbosa | F16D 65/18 |
| | | | | 188/72.7 |

FOREIGN PATENT DOCUMENTS

| | | |
|---|---|---|
| WO | 2011113554 A2 | 9/2011 |
| WO | 2015135014 A1 | 9/2015 |

* cited by examiner

DISC BRAKE

FIELD OF THE INVENTION

The present invention relates to a disc brake, in particular for a utility vehicle.

BACKGROUND OF THE INVENTION

In this connection the invention shall include disc brakes which either comprise a sliding caliper or a fixed caliper, which overlap one or more brake discs. Mainly but not exclusively the invention relates to disc brakes of the spot-type.

Disc brakes, in particular for heavy load trucks, are known with different configurations, both with respect to the type of the actuation mechanism, with respect to the way of the transmission of the braking force onto one or several brake discs and with respect to the type of the adjustment for compensating the brake lining wear.

With respect to the brake actuation mechanism, the present invention shall preferably, but not exclusively, relate to a single tappet design as it is known e.g. from International patent application WO 2011/113554 A2 of the applicant, in which the elements of the return mechanism and the adjustment mechanism are incorporated into the tappet design and surrounded by the unit consisting of the outer and inner sleeves, which both form part of the adjustment mechanism and thus brake actuation mechanism. The adjustment mechanism incorporated therein is driven by a rotatable lever, which introduces the clamping force from an actuator into the brake actuation mechanism. The rotatable lever is arranged such that the introduction of the clamping force into the elements of the brake actuation mechanism, e.g. the thrust element and the adjuster, is directed more or less in axial direction in relation to the brake disc, i.e. in a direction substantially parallel of the rotation axis of the brake disc; the lever thus basically rotates towards the brake disc. In this regard, the present invention shall refer to disc brakes of the axial type.

SUMMARY OF THE INVENTION

Independent from the actual design of the brake actuation mechanism to be employed in this connection, the invention aims for a new configuration and arrangement of an actuator for the rotatable lever and of the rotatable lever itself, which allows the adaptation of the disc brake, in particular with respect to the external position of the actuator, to different spatial constraints being present in different types of vehicles.

A further object can be seen in the provision of a brake actuation mechanism which is easy to assemble and the single components of which can be manufactured in an easy and cost-effective manner.

These objects, respectively, are solved by a disc brake according to claim 1.

According to the invention a disc brake is proposed which comprises a brake caliper, which overlaps at least one brake disc, and a brake actuation mechanism being arranged inside the caliper and having
  an amplification mechanism comprising a brake lever being rotatable around a pivot bearing for introducing the clamping force from an actuator,
  a thrust element for transmitting the amplified clamping force onto the brake disc,
  in which a force-redirecting device is arranged between the actuator and the brake caliper for transmitting an input force from the actuator to the brake lever.

The force-redirecting device may be supported in a swivelling manner inside a housing, the housing being attached to the caliper.

The force-redirecting device is preferably configured as a triangular shaped lever comprising one end which receives a piston from the actuator and another end which receives the end of a transmission rod for connecting to an actuator connecting means of the brake lever, wherein both ends are orientated towards each other by a defined angle which is selected depending on the spatial needs of the entire assembly.

According to a preferred embodiment, angular connecting means are provided which are arranged between the brake caliper and the housing of the force-redirecting device, which angular connecting means are configured to allow different angular positions of the housing of the force-redirecting device in relation to the caliper, so as to provide further adaptation possibilities to spatial needs.

These angular connecting means may comprise a flange ring which will be fixed e.g. by bolts to a corresponding flange of the brake caliper, in which the flange ring is configured to be fixed to the end of the housing of the force-redirecting device in relative different angular positions.

For that purpose, the flange may comprise a series of recesses or bores to cooperate with pins of the housing.

Furthermore, the housing of the force-redirecting device may comprise a pipe section configured to traverse the flange ring and to be fixed to the flange ring by a nut ring, the nut ring being received inside the flange ring.

The provision of a force-redirecting device in connection with angular connecting means, even further in combination with a brake lever of the axial type, enables a high degree of variability with respect to the adjustment of the position of the actuator in relation to the brake caliper.

According to another embodiment of the invention, the amplification mechanism and the thrust element shall be mounted in functional cooperation in the brake caliper by means of a rod, which rod is supported in the housing of the brake caliper so as to be not displaceable in axial direction, when assembled.

In this respect, the brake actuation mechanism with all its single components shall be configured and arranged in such a way that the cooperation with the rod basically may be realized as this is described in detail in the International patent application WO 2011/113554 A2 in the name of the applicant, the disclosure of which shall herewith be exclusively included by reference.

In other words, the rod shall serve as the mounting means which keeps the single components of the brake actuation mechanism, such as the amplification mechanism, the adjuster, the thrust element, the return device and the lever, together in functional cooperation, wherein these components could be split into different self-supporting sub-modules or units for assembly purposes. In particular the rod serves to also mount the single brake components in the housing of the brake caliper in such a way that these components do act in parallel to the rotational axis of the brake disc.

The rod can be configured such that it will be fixed in the housing of the brake caliper to be non-movably supported in axial direction.

In a further embodiment of the invention, the brake lever may be configured to be mounted at different angular positions around the axis of the rod.

In other words, according to the invention the brake lever can be mounted in an angular position in relation to the rod, and thus in relation to the axis of the brake disc and with respect to the thrust element, to allow, in correspondence with an adapted design of the housing of the brake caliper, adaptation to different spatial constraints around the wheel axle and in the surrounding chassis, which may exist for different vehicles, as e.g. for cross-road trucks or low-floor buses.

According to one embodiment, a transmission means of the brake lever is configured to be decoupled from the thrust element so as to be rotatable with respect to the thrust element. In particular, the transmission means shall be configured such that different angular positions are allowed in relation to the thrust element.

In order to allow that the brake lever can be mounted in a defined angular position with respect to the rod, in particular for such single tappet designs of the brake actuation mechanism as mentioned above, the transmission means of the lever comprises a recess with is freely traversed by said rod, which allows that the transmission means can freely rotate around that rod upon assembly.

The brake caliper may comprise an extended, neck-like housing section, which is configured according to the desired final angular orientation of the brake lever.

At the end of the extended section of the caliper the housing containing the force-redirecting device may be attached, accordingly.

Furthermore, the disc brake according to the invention in one embodiment may additionally be designed such that the brake lever is configured and arranged in relation to the thrust element so that the clamping force from the actuator is substantially directed perpendicular to the axis of the brake disc upon brake actuation.

BRIEF DESCRIPTION OF THE DRAWINGS

Furthermore, the disc brake according to the invention in one embodiment may additionally be designed such that the brake lever is configured and arranged in relation to the thrust element so that the clamping force from the actuator is substantially directed perpendicular to the axis of the brake disc upon brake actuation.

FIGS. 1 to 3 shows a disc brake in one possible embodiment according to the invention in perspective view with its substantial components, which are shown in their assembled state.

DETAILED DESCRIPTION OF THE INVENTION

Figure 1:
FIG. 1 is a perspective, partially cut-out view of a brake caliper containing a brake actuation mechanism.

The disc brake comprises a brake caliper 1 which is slideably guided on a carrier 2. The brake caliper 1 receives a brake actuation mechanism 3 preferably, but not exclusively, of that kind as it is described in WO 2011/113554 A2.

The brake actuation mechanism 3 comprises a brake lever 4, which is arranged so as to mainly apply a clamping force axially to the brake disc, i.e. the brake lever 4 swivels towards the brake disc around an eccentric pivot bearing 5.

The brake lever 4 comprises an actuator connecting means 6 to which a piston (not shown) of an external actuator may attach.

The brake actuation mechanism 3 according to the invention is designed in such a way that it on the one hand enables a simple assembly in the brake caliper 1 and on the other hand realizes a faultless functioning with at the same time compact configuration due to the specific arrangement of the single components in relation to each other.

Basically, the brake actuation mechanism 3 comprises an amplification mechanism 7, which introduces the clamping force originating from the actuator, or via further force-redirecting means and via a transmission rod as explained further down below, into the brake actuation mechanism 3 and thereby enforcing it in correspondence with a gear ratio being determined by its construction. This is achieved in that the brake lever 4 is pivotably supported against the pivot bearing 5, which is eccentrically arranged with respect to a force-transmitting block 8, the force-transmitting block 8 being in attachment with a thrust element 9.

The thrust element 9 itself is linearly axially guided in the brake caliper 1 so as to advance towards the brake disc upon rotation of the brake lever 4.

The force-transmitting block 8 is formed as one piece, preferably as a casted or forged component, and comprises on the side of the lever two substantially half circular recesses for rotatably receiving the brake lever 4. At the side of the brake disc the force-transmitting block 8 is formed with planar surfaces in order to abut against the thrust element 9 or any component of an adjuster mechanism (not shown) being received in the interior of the thrust element 9.

The brake actuation mechanism 3 comprises a centrally arranged rod 10, which is fixed in the rear of the caliper 1 in threaded engagement.

As already explained above, according to the invention, in particular the rod 10 serves to keep the amplification mechanism 7 and/or a not-shown adjustment device and/or the thrust element 9 and/or a not-shown return device together as a self-supporting assembly unit, either all components as one single module or several components as separate sub-modules, each as pre-mounted self-supporting assembly units, for assembly purposes, while the central rod 10 is aligned co-axially to the axis of the brake disc.

For the exact functioning and assembly of such brake actuation mechanism 3, as an example, reference shall be made to WO 2011/113554 A2.

Figure 3:
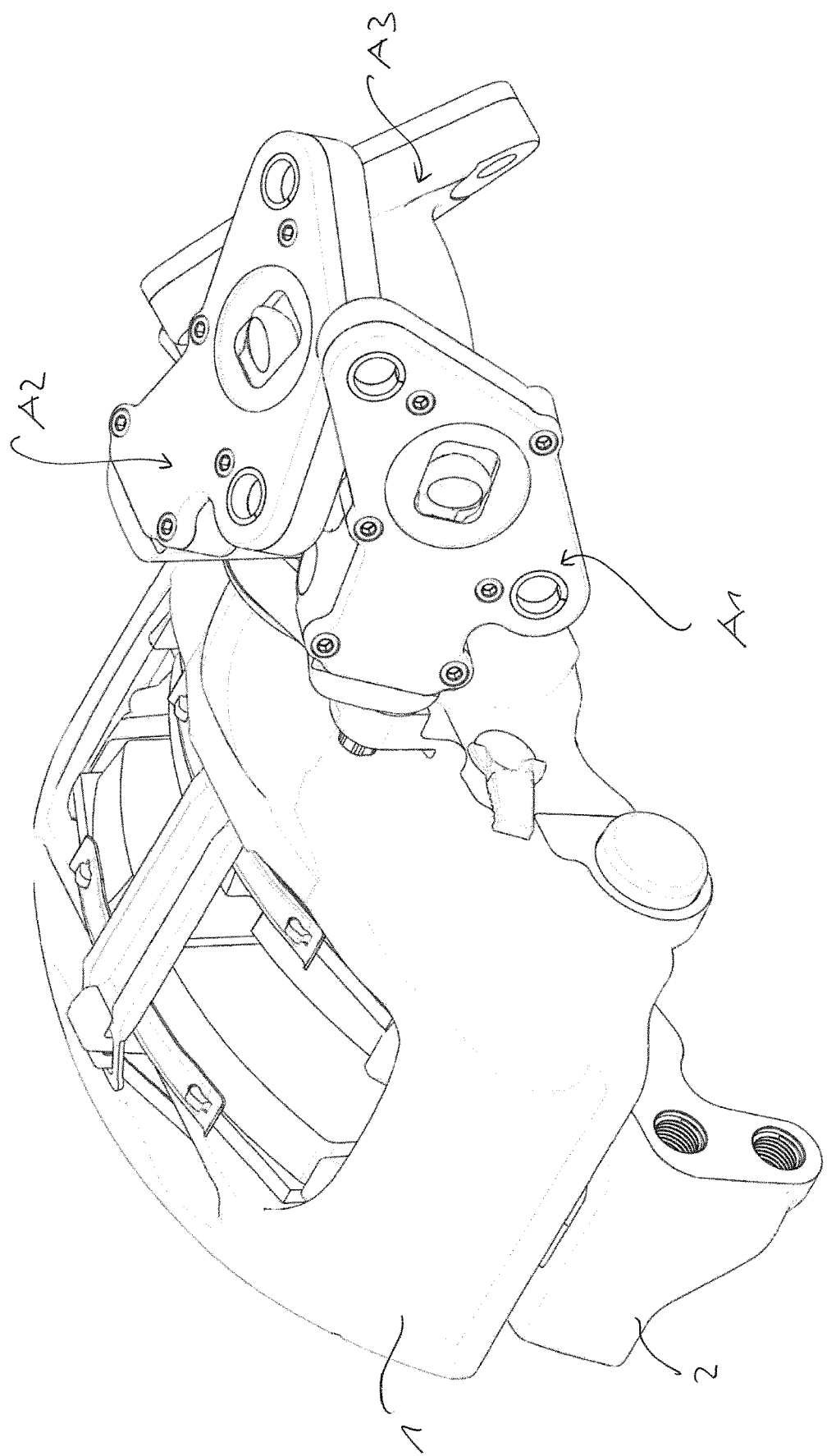
FIG. 3 is a perspective view schematically showing different angular positions of a housing of a force-redirecting device.

According to the invention, in order to adapt to spatial needs resulting from constraints in the surroundings of the disc brake, in particular with respect to the arrangement of the external actuator, the brake lever 4 could be arranged angularly offset both with respect to the horizontal and vertical plane, which planes being defined in relation to the axis of the brake disc. By that the brake lever 4 can be also arranged at corresponding angular positions, as this is simulated schematically in FIG. 3 by different angular positions A1-A3 of the housing of the force-redirecting device.

Thus, the brake lever 4 thereby is also angularly offset, i.e. turned in relation to the axis or longitudinal extension of the rod 10 and to the orientation of the thrust element 9.

This is particularly enabled in that the entire brake actuation mechanism 3 according to the invention is, by the majority, rotationally symmetrically orientated around the central rod 10. Since furthermore the force-transmitting block 8 does abut against the thrust element 9 (or against components thereof) in a planar way, but rotatably decoupled therefrom, it is enabled to rotate the brake lever 4 with the single components of the amplification mechanism 7 with respect to the rod 10 and with respect to the axially linearly guided thrust element 9 and fix the brake lever 4 with the amplification mechanism 7 in the desired angular position.

Figure 2:
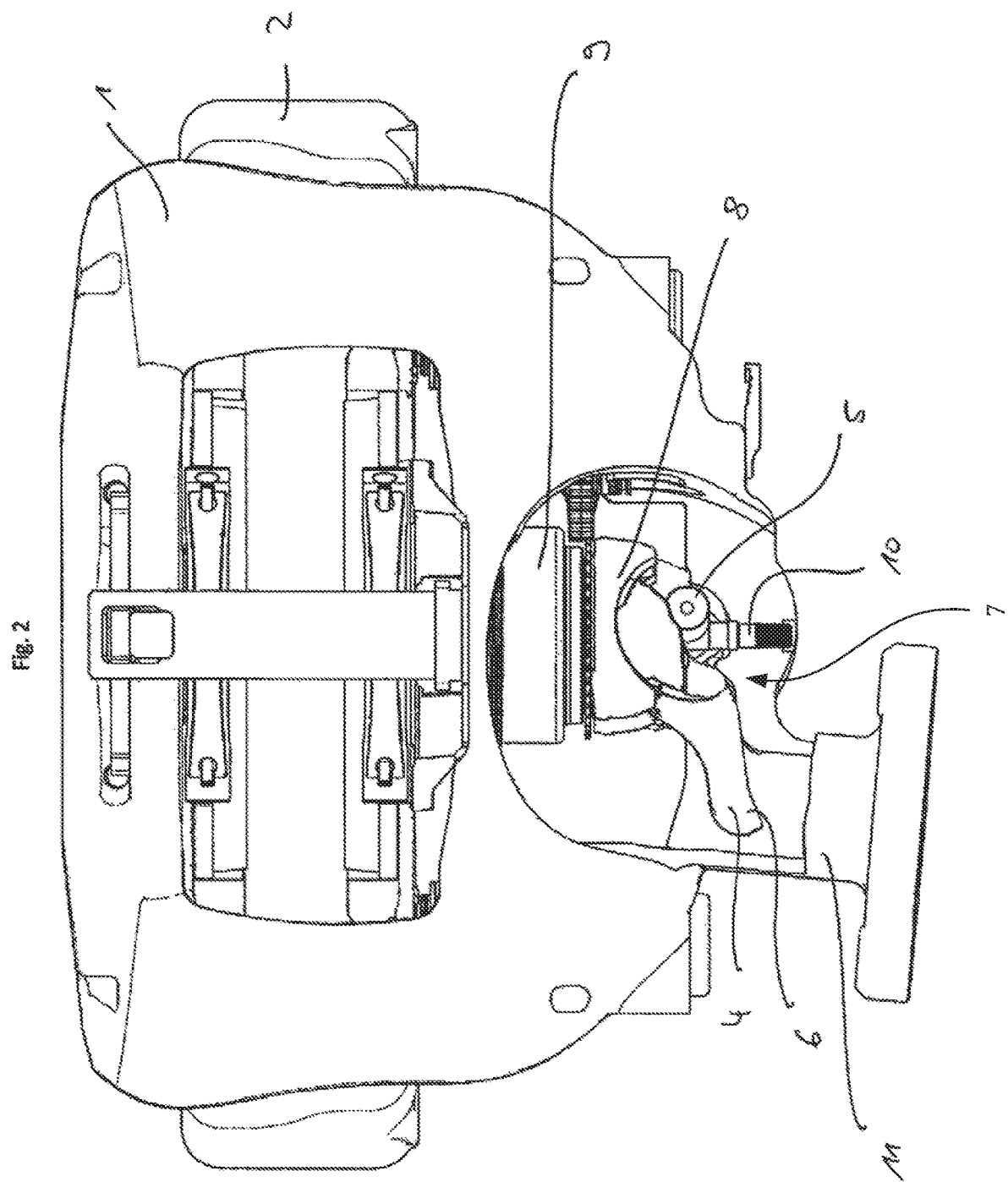
FIG. 2 is a partially cut-out top view of the brake caliper of FIG. 1.

As can be seen in FIG. 2, the brake caliper 1 comprises a neck-like housing section 11 for attachment of a housing 32 of a force-redirecting device.

The housing 32 of the force-redirecting device shall be attached to the neck 11 of the brake caliper 1 by means of angular connecting means 33. The angular connecting means 33 in fact are configured to allow that the housing 32 of the force-redirecting device can be rotated around the neck 11 of the caliper 1.

Figure 4:
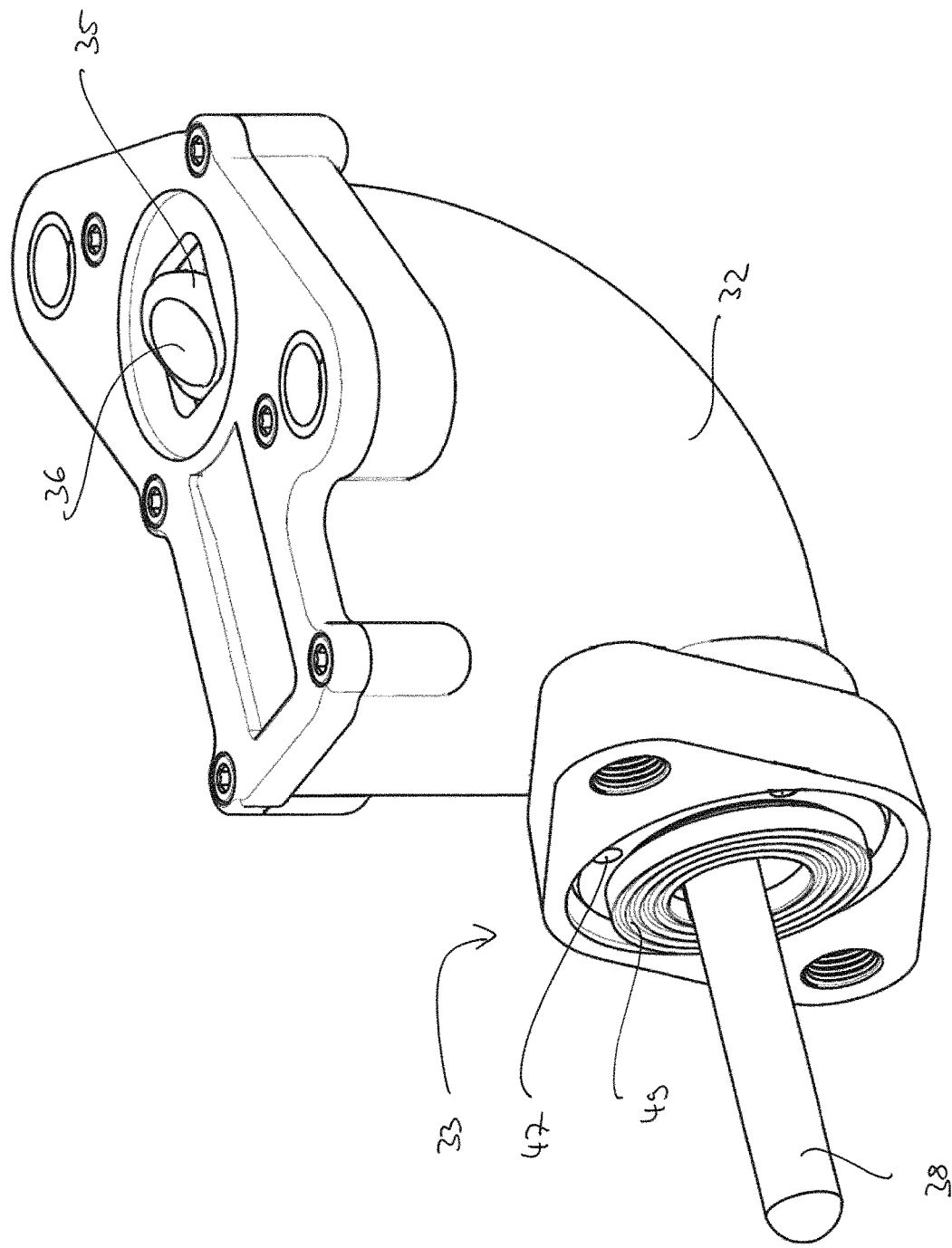
FIG. 4 is perspective view of the housing of the force-redirecting device.
Figure 5:
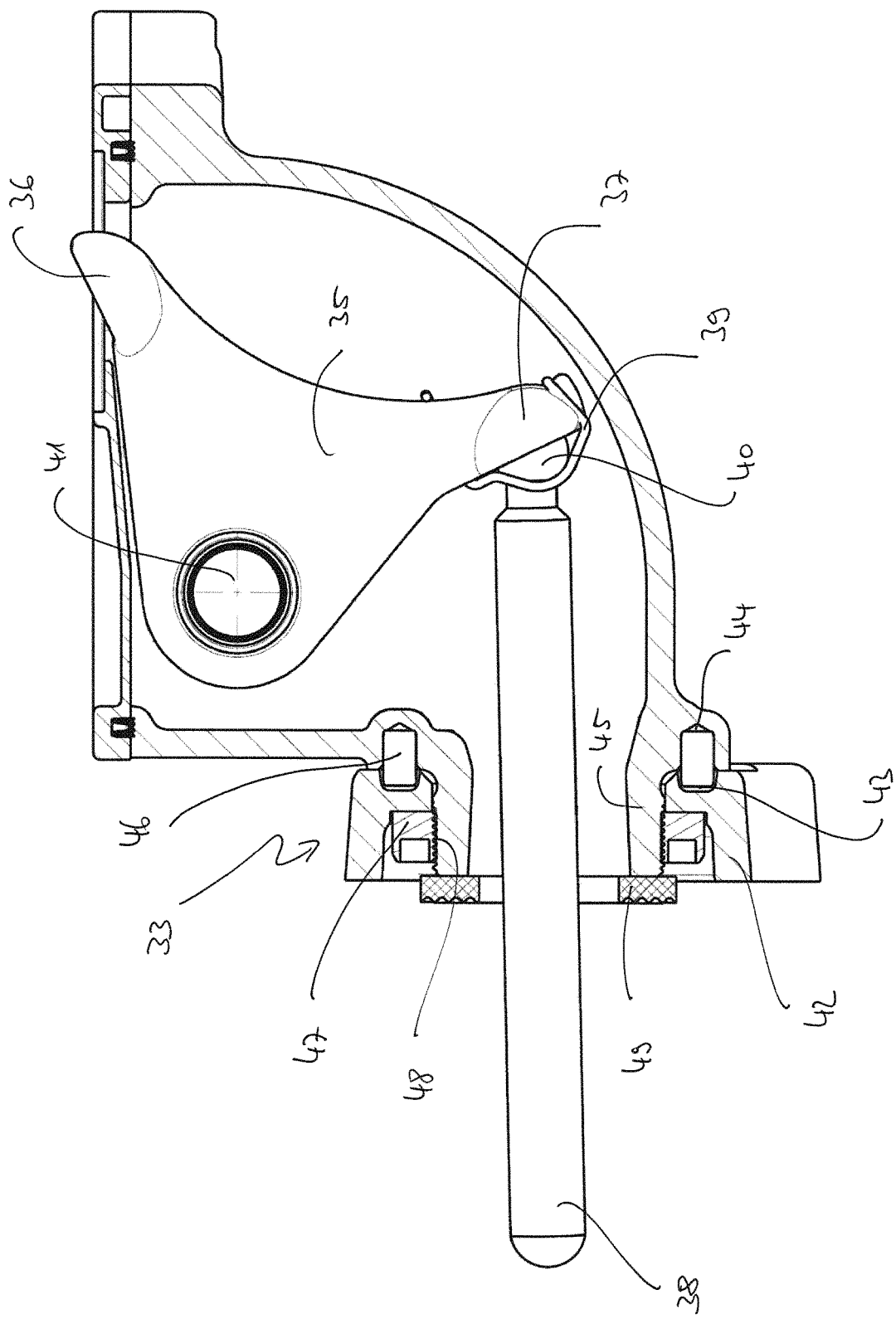
FIG. 5 is a cross-sectional view of the housing of the force-redirecting device.

The housing 32 of the force-redirecting device is shown in perspective view in FIG. 4, whereas in FIG. 5 a cross-section is provided which indicates the single components of the force redirecting device and explains the principle of the angular connecting means 33.

The force-redirecting device is basically configured as a triangular shaped lever 35, which lever 35 is being supported inside the housing 32 in a swivelling manner.

One end 36 of the triangular shaped lever 35 is adapted to attach to a piston (not shown) of an actuator, while the other end 37 of it is fixedly, but relatively movably connected to a transmission rod 38 by means of a holding clamp 39. The holding clamp 39 holds the ball-shaped end 40 of the transmission rod 38 freely rotatably in a correspondingly concave reception of the end 37 of the triangular shaped lever 35.

The transmission rod 38 shall attach to the actuator connection means 6 of the brake lever 4.

The triangular shaped lever 35 is pivotably supported in the housing 32 by means of a pivot bearing 41.

The angular connecting means 33, with which the housing 32 of the force-redirecting device 35 will be attached to the flange-like end of the neck 11 of the caliper 1, comprises a flange ring 42.

The flange ring 42 comprises a circular series of recesses or bores 43, as best can be seen in FIG. 4.

A corresponding series of recesses or bores 44 is circularly arranged around a pipe section 45 of the housing 32, the pipe section 45 being traversed by the transmission rod 38.

Pins 46 can be placed at and inserted into corresponding bores 44 of the housing 32, so as to define connection means for the flange ring 42, the latter will then be fixed in a particular angular position in that bores 43 of the flange ring 42 receive the pins 46.

A nut ring 47 is provided, which will be screwed onto an outer thread 48 of the pipe section 45 and inside a circular groove of the flange ring 42, thereby fixing the latter in a previously selected relative position as defined by the pin connection between the housing 32 and the flange ring 42. Furthermore, a sealing ring 49 is provided to seal the housing 32 in relation to the brake caliper 1.

LIST OF REFERENCE NUMERALS

1 Brake caliper
2 Carrier
3 Brake actuation mechanism
4 Brake lever
5 Eccentric pivot bearing
6 Actuator connection means
7 Amplification mechanism
8 Force-transmitting block
9 Thrust element
10 Rod
11 Rear extending housing section
32 Housing force-redirecting device
33 Angular connecting means
34
35 Triangular lever/force-redirecting device
36 End to actuator
37 End to transmission rod
38 Transmission rod
39 Holding clamp
40 Ball-shaped end
41 Pivot bearing
42 Flange ring
43 Bores of flange ring
44 Bores of pipe section
45 Pipe section
46 Pins
47 Nut ring
48 Thread
49 Seal
A1-A3 Angular positions housing 32

The invention claimed is:

1. A disc brake comprising a brake caliper, which overlaps at least one brake disc, and a brake actuation mechanism being arranged inside the caliper and having:
    an amplification mechanism comprising a brake lever being rotatable around a pivot bearing for introducing a clamping force from an actuator,
    a thrust element for transmitting an amplified clamping force onto the brake disc,
    a force-redirecting device being arranged between the actuator and the brake caliper for transmitting an input force from the actuator to the brake lever,
    wherein the force-redirecting device is supported in a swiveling manner inside a housing, the housing being attached to the caliper, and
    wherein a flange ring is arranged between the caliper and the housing and is configured to be fixed to the caliper and comprises a series of recesses cooperating with pins of the housing, the flange ring configured to allow different angular positions of the housing in relation to the caliper.

2. The disc brake according to claim 1, wherein the housing comprises a pipe section configured to traverse the flange ring, the flange ring to be fixed to the housing by a nut ring, the nut ring being received inside the flange ring and screwed onto an outer thread of said pipe section, thereby fixing said flange ring in a selected angular position as defined by the pin connection between the housing and the flange ring.

3. The disc brake according to claim 2, wherein the force-redirecting device is connected to a transmission rod, the transmission rod traversing the pipe section and connecting to the brake lever.

4. The disc brake according to claim 3, wherein the brake lever is configured to be mounted at different angular positions around the axis of the rod.

5. The disc brake according to claim 1, wherein the amplification mechanism and the thrust element are mounted in functional cooperation in the brake caliper by means of a rod, which rod is supported in the housing of the brake caliper so as to be not displaceable in an axial direction.

6. The disc brake according to claim 1, wherein a brake lever is configured and arranged in relation to the thrust element so that the clamping force from the actuator is substantially directed perpendicular to an axis of the brake disc upon brake actuation.

7. The disc brake according to claim 1, wherein said flange ring is fixed to the end of said housing of the force-redirecting device in relative different angular positions.

8. A disc brake comprising a brake caliper, which overlaps at least one brake disc, and a brake actuation mechanism being arranged inside the caliper and having:
- an amplification mechanism comprising a brake lever being rotatable around a pivot bearing for introducing a clamping force from an actuator,
- a thrust element for transmitting an amplified clamping force onto the brake disc,
- a force-redirecting device being arranged between the actuator and the brake caliper for transmitting an input force from the actuator to the brake lever,
- wherein the force-redirecting device is supported in a swiveling manner inside a housing, the housing being attached to the caliper,
- wherein connecting means are arranged between the caliper and the housing and pins are configured to be placed at and inserted into bores of the housing defining the connecting means for a flange ring with respect to an angular position.

9. The disc brake according to claim 8, wherein the housing comprises a pipe section configured to traverse the flange ring, the flange ring to be fixed to the housing by a nut ring, the nut ring being received inside the flange ring and screwed onto an outer thread of said pipe section, thereby fixing said flange ring in a selected angular position as defined by the pin connection between the housing and the flange ring.

10. The disc brake according to claim 9, wherein the force-redirecting device is connected to a transmission rod, the transmission rod traversing the pipe section and connecting to the brake lever.

11. The disc brake according to claim 10, wherein the brake lever is configured to be mounted at different angular positions around the axis of the rod.

12. The disc brake according to claim 8, wherein the amplification mechanism and the thrust element are mounted in functional cooperation in the brake caliper by means of a rod, which rod is supported in the housing of the brake caliper so as to be not displaceable in an axial direction.

13. The disc brake according to claim 8, wherein a brake lever is configured and arranged in relation to the thrust element so that the clamping force from the actuator is substantially directed perpendicular to an axis of the brake disc upon brake actuation.

14. A disc brake comprising a brake caliper, which overlaps at least one brake disc, and a brake actuation mechanism being arranged inside the caliper comprising:
- an amplification mechanism having a brake lever being rotatable around a pivot bearing for introducing the clamping force from an actuator,
- a thrust element for transmitting the amplified clamping force onto the brake disc,
- a force-redirecting device having a housing attached to the caliper and arranged between the actuator and the brake caliper for transmitting an input force from the actuator to the brake lever,
- a flange ring fixed to the caliper and having a series of recesses cooperating with pins of the housing to allow different angular positions of the housing in relation to the caliper.

15. The disc brake according to claim 14, wherein the force-redirecting device is supported in a swiveling manner inside the housing.

16. The disc brake according to claim 14, wherein the housing comprises a pipe section configured to traverse the flange ring, the flange ring to be fixed to the housing by a nut ring, the nut ring being received inside the flange ring and screwed onto an outer thread of said pipe section, thereby fixing said flange ring in a selected angular position as defined by the pin connection between the housing and the flange ring.

17. The disc brake according to claim 16, wherein the force-redirecting device is connected to a transmission rod, the transmission rod traversing the pipe section and connecting to the brake lever.

18. The disc brake according to claim 17, wherein the brake lever is configured to be mounted at different angular positions around the axis of the rod.

19. The disc brake according to claim 14, wherein the amplification mechanism and the thrust element are mounted in functional cooperation in the brake caliper by means of a rod, which rod is supported in the housing of the brake caliper so as to be not displaceable in an axial direction.

20. The disc brake according to claim 14, wherein a brake lever is configured and arranged in relation to the thrust element so that the clamping force from the actuator is substantially directed perpendicular to an axis of the brake disc upon brake actuation.

\* \* \* \* \*